US011795071B2

(12) United States Patent
Alamoudi et al.

(10) Patent No.: US 11,795,071 B2
(45) Date of Patent: Oct. 24, 2023

(54) MULTI-VALENT ION CONCENTRATION USING MULTI-STAGE NANOFILTRATION

(71) Applicant: Saline Water Conversion Corporation, Jubail (SA)

(72) Inventors: Ahmed Saleh Mohammed Alamoudi, Al-Jubail (SA); Christopher Michael Fellows, Armidale (AU); Mohammed Farooque Ayumantakath, Al-Jubail (SA); Nikolay Voutchkov, Winter Springs, FL (US); Sangho Lee, Seoul (KR); Seungwon Ihm, Al-Khobar (SA)

(73) Assignee: SALINE WATER CONVERSION CORPORATION, Jubail (SA)

( * ) Notice: Subject to any disclaimer, the term of this patent is extended or adjusted under 35 U.S.C. 154(b) by 88 days.

(21) Appl. No.: 17/226,452

(22) Filed: Apr. 9, 2021

(65) Prior Publication Data
US 2021/0221707 A1 Jul. 22, 2021

Related U.S. Application Data

(62) Division of application No. 16/547,720, filed on Aug. 22, 2019, now abandoned.

(51) Int. Cl.
*C02F 1/44* (2023.01)
*B01D 61/02* (2006.01)
(Continued)

(52) U.S. Cl.
CPC ............ *C02F 1/442* (2013.01); *B01D 61/026* (2022.08); *B01D 61/027* (2013.01); *B01D 61/08* (2013.01);
(Continued)

(58) Field of Classification Search
CPC ................. C02F 1/442; C02F 2103/08; C02F 2301/046; C02F 2301/08; B01D 61/026;
(Continued)

(56) References Cited

U.S. PATENT DOCUMENTS 2,163,877 A   6/1939 Hooker
2,405,055 A   7/1946 Robinson et al.
(Continued)

FOREIGN PATENT DOCUMENTS

CN   110064305   7/2019
CN   111484178   8/2020
(Continued)

OTHER PUBLICATIONS

International Preliminary Report on Patentability (PCT/IB/326 & PCT/IB/373) issued in PCT Application No. PCT/US2019/047751 dated Mar. 3, 2022, including Written Opinion (PCT/ISA/237) (15 pages).
(Continued)

*Primary Examiner* — Krishnan S Menon
(74) *Attorney, Agent, or Firm* — NORTON ROSE FULBRIGHT US LLP

(57) ABSTRACT

A system and method for producing from saline source water a product containing an increased ratio of multi-valent ions to mono-valent ions, which includes multiple nanofiltration units arranged to selectively remove mono-valent ions from the water fed into each nanofiltration stage in the nanofiltration permeate stream while retaining multi-valent ions in the nanofiltration reject stream. The rate at which the increase in the multi-valent ion- to mono-valent ion ratio is obtained may be enhanced by introduction of lower salinity water into the nanofiltration reject between stages, and by recirculating a portion of downstream nanofiltration reject flow into an upstream nanofiltration unit. The enhanced
(Continued)

multi-valent ion product is suitable for multiple uses, including irrigation of plants and remineralization of desalinated water. The relative concentrations of the multi-valent ions in the product may be adjusted, for example by selection of nanofiltration membrane technologies which have higher or lower rejection for specific multi-valent ions.

12 Claims, 5 Drawing Sheets

(51) Int. Cl.
  *B01D 61/08* (2006.01)
  *C02F 103/08* (2006.01)
(52) U.S. Cl.
  CPC ...... *B01D 2311/08* (2013.01); *B01D 2311/25* (2013.01); *B01D 2317/022* (2013.01); *B01D 2317/025* (2013.01); *C02F 2103/08* (2013.01); *C02F 2301/046* (2013.01)
(58) Field of Classification Search
  CPC .. B01D 61/027; B01D 61/08; B01D 2311/08; B01D 2311/25; B01D 2317/022; B01D 2317/025; Y02A 20/131
  See application file for complete search history.

(56) References Cited

U.S. PATENT DOCUMENTS

| | | | |
|---|---|---|---|
| 2,536,457 | A | 1/1951 | Martin |
| 4,180,547 | A | 12/1979 | Chirico |
| 4,392,959 | A | 7/1983 | Coillet |
| 5,238,574 | A | 8/1993 | Kawashima et al. |
| 6,113,797 | A | 9/2000 | Al-Samadi |
| 6,508,936 | B1 | 1/2003 | Hassan |
| 7,037,481 | B2 | 5/2006 | Becenel, Jr. |
| 7,083,730 | B2 | 8/2006 | Davis |
| 7,314,606 | B2* | 1/2008 | Sridhar ............... C01C 3/20 210/651 |
| 7,563,375 | B2 | 7/2009 | Liberman |
| 8,128,821 | B2 | 3/2012 | Oklejas, Jr. |
| 8,501,034 | B2 | 8/2013 | Hook et al. |
| 9,005,404 | B2 | 4/2015 | Batty et al. |
| 9,045,351 | B2 | 6/2015 | Wallace |
| 9,206,060 | B1 | 12/2015 | Abusharkh |
| 9,233,340 | B1 | 1/2016 | Elish et al. |
| 9,427,705 | B1 | 8/2016 | Abusharkh |
| 9,808,764 | B2 | 11/2017 | Oklejas, Jr. |
| 10,005,688 | B2 | 6/2018 | Sekine et al. |
| 10,052,589 | B2 | 8/2018 | Oklejas, Jr. |
| 10,071,929 | B2 | 9/2018 | Sekine et al. |
| 10,202,291 | B2 | 2/2019 | Tokunaga et al. |
| 10,214,437 | B2 | 2/2019 | Blohm et al. |
| 10,214,438 | B2 | 2/2019 | Blohm et al. |
| 10,245,555 | B2 | 4/2019 | St. John et al. |
| 10,300,436 | B2 | 5/2019 | Townsend et al. |
| 10,603,635 | B2 | 3/2020 | Wei et al. |
| 10,843,951 | B2 | 11/2020 | Fitzpatrick et al. |
| 10,845,067 | B2 | 11/2020 | Martin |
| 10,947,143 | B2 | 3/2021 | Alamoudi et al. |
| 11,230,479 | B2 | 1/2022 | Mack et al. |
| 11,247,174 | B2 | 2/2022 | Liu et al. |
| 11,279,643 | B2 | 3/2022 | Lahav et al. |
| 2002/0166823 | A1 | 11/2002 | Mukhopadhyay |
| 2004/0211726 | A1 | 10/2004 | Baig et al. |
| 2005/0067341 | A1 | 3/2005 | Green et al. |
| 2006/0157409 | A1 | 7/2006 | Hassan |
| 2007/0080113 | A1 | 4/2007 | Vuong |
| 2007/0246406 | A1 | 10/2007 | Dibel et al. |
| 2010/0192575 | A1 | 8/2010 | Al-Mayahi et al. |
| 2013/0270186 | A1 | 10/2013 | Wohlert |
| 2014/0021135 | A1 | 1/2014 | Sawyer et al. |
| 2014/0216934 | A1* | 8/2014 | Fu .................. C02F 1/4695 204/627 |
| 2014/0299546 | A1 | 10/2014 | Eckert et al. |
| 2015/0053085 | A1 | 2/2015 | Mahley, III |
| 2015/0136699 | A1 | 5/2015 | Wohlert |
| 2016/0176728 | A1 | 6/2016 | Lo et al. |
| 2016/0339390 | A1 | 11/2016 | Abusharkh |
| 2017/0144106 | A1 | 5/2017 | McCool et al. |
| 2017/0349465 | A1 | 12/2017 | Blohm et al. |
| 2017/0349467 | A1 | 12/2017 | Blohm et al. |
| 2018/0236406 | A1 | 8/2018 | St. John et al. |
| 2019/0054421 | A1 | 2/2019 | Wei et al. |
| 2020/0023317 | A1 | 1/2020 | Zhai et al. |
| 2020/0316526 | A1 | 8/2020 | George et al. |
| 2021/0261445 | A1 | 8/2021 | Nakamura et al. |
| 2021/0322929 | A1 | 10/2021 | Mack et al. |
| 2022/0119281 | A1 | 4/2022 | Mack et al. |
| 2022/0249983 | A1 | 8/2022 | Holtzapple |
| 2022/0258102 | A1 | 8/2022 | Townsend et al. |

FOREIGN PATENT DOCUMENTS

| | | |
|---|---|---|
| GB | 2395946 | 6/2004 |
| JP | 10225683 | 8/1998 |
| WO | WO 2006/087302 A1 | 8/2006 |
| WO | WO 2010/077895 A1 | 7/2010 |
| WO | WO 2010/132104 A1 | 11/2010 |
| WO | WO 2013/131183 A1 | 9/2013 |
| WO | WO 2017/030937 | 2/2017 |
| WO | WO 2017/136048 | 8/2017 |
| WO | WO 2020/041160 A1 | 2/2020 |
| WO | WO 2021/026498 | 2/2021 |
| WO | WO 2021/221462 | 11/2021 |
| WO | WO 2022/061197 | 3/2022 |
| WO | WO 2022/126671 | 6/2022 |
| WO | WO 2022/153980 | 7/2022 |

OTHER PUBLICATIONS

International Search Report (PCT/ISA/210) issued in PCT Application No. PCT/US2019/047751 dated Oct. 29, 2019 (two (2) pages).
"Chemical Treatment for RO and NF", *Hydranautics: Nitto Group Company*, Technical Application Bulletin No. 111, pp. 1-16, May 2017.
Bartholomew, T.V. et al., "Osmotically Assisted Reverse Osmosis for High Salinity Brine Treatment", *Desalination*, 421, pp. 3-11, 2017.
Altaee et al., "Alternative design to dual stage NF seawater desalination using high rejection brackish water membranes", *Desalination*, 273(2-3), pp. 391-397, 2011.
Birnhack et al., "Implementation, Design and Cost Assessment of a Membrane-Based Process for Selectively Enriching Desalinated Water with Divalent Seawater Ions", *ChemEngineering*, (2018), 2, 41, pp. 1-13.
Davenport et al., "High-Pressure Reverse Osmosis for Energy-Efficient Brine Desalination: Current Status, Design Considerations and Research Needs", *Environmental Science & Technology Letters*, Jun. 29, 2018, pp. 467-475 vol. 5.
Extended European Search Report issued in European Application No. 19923420.4, dated Apr. 24, 2023.
Gräber et al., "A pre-treatment concept for increasing the recovery ratio of coastline BWRO plants, while providing Mg2+ in the product water", *Desalination*, 515 (2021), pp. 1-10.
International Search Report & Written Opinion issued in PCT Application No. PCT/IB2022/062168, dated Mar. 2, 2023.
International Search Report & Written Opinion issued in PCT Application No. PCT/IB2022/062404, dated Mar. 3, 2023.
International Search Report & Written Opinion issued in PCT Application No. PCT/IB2019/026804, dated Jul. 3, 2019.
Loganathan, P. et al., " Mining valuable minerals from seawater: a critical review", *Environmental Science Water Research & Technology*, 3, pp. 37-53, 2017.
Meijer et al., "Solubilities And Supersaturations Of Calcium Sulfate And Its Hydrates In Seawater", *Desalination*, vol. 51 (1984), pp. 255-305.

(56) References Cited

OTHER PUBLICATIONS

Nativ et al., "DiaNanofiltration-based method for inexpensive and selective separation of Mg2+ and Ca2+ ions from seawater, for improving the quality of soft and desalinated waters", *Separation and Purification Technology*, 166 (2016), pp. 83-91.

Nativ et al., "Desalinated brackish water with improved mineral composition using monovalent-selective nanofiltration followed by reverse osmosis", *Desalination*, 520 (2021), pgs. 1-7.

Nativ et al.,"Dia-nanofiltration-electrodialysis hybrid process for selective removal of monovalent ions from Mg2+ rich brines", *Desalination*, 481 (2020), pgs. 1-12.

Peters, C.D. et al., "Osmotically assisted reverse osmosis (OARO): Five approaches to dewatering saline brines using pressure-driven membrane processes", *Department of Engineering Science, The University of Oxford*, 17 pages, 2018.

Tang et al., "Highly-selective separation of divalent ions from seawater and seawater RO retentate", *Separation and Purification Technology*, 175 (2017), pp. 460-468.

Tang et al., "Selective separation of divalent ions from seawater using an integrated ion-exchange/nanofiltration approach", *Chemical Engineering & Processing: Process Intensification*, 126 (2018), pp. 8-15.

Weingerger, A. et al., "By-products from saline water conversion plants", *American Cyanamid Company*, 110, 74 pp., 1964.

\* cited by examiner

MULTI-VALENT ION CONCENTRATION USING MULTI-STAGE NANOFILTRATION

CROSS REFERENCE TO RELATED APPLICATIONS

This application is a divisional of U.S. application Ser. No. 16/547,720, filed on Aug. 22, 2019, the disclosure of which is expressly incorporated by reference herein.

The present invention relates to design and operation of ion extraction facilities, and in particular to a system and method for efficient and economical recovery of minerals in desired ratios of concentrations from saline source water.

BACKGROUND OF THE INVENTION

Saline water sources (e.g., seawater, brackish water, brine) typically contain a large number of different dissolved ions in the form of minerals. In order to utilize the dissolved ions for various applications, it is desirable to selectively separate the dissolved ions, either alone or in combination with similar ions, with high purity.

Nano-filtration (NF) is a well-known membrane-based separation method which is selective in rejecting different ions from a feed water source, depending, for example, on the size and charge of the ions and their salt diffusion coefficients in water. In general, NF has higher rejection of multi-valent ions and lower rejection of mono-valent ions. Therefore, NF can be used for concentration of multi-valent ions, where the multi-valent ions of interest in saline water are concentrated in the NF reject (also known as NF retentate) stream, while a significant portion of the mono-valent ions pass through the membrane and are released in the NF permeate stream.

In order to achieve higher purity and content of the desired multi-valent ions, the concentration of the multi-valent ions should be maximized, and the concentration of mono-valent ions should be minimized. Unfortunately, NF membranes do not provide complete separation of multi-valent and mono-valent ions. Moreover, even if a hypothetical ideal NF membrane had 100% rejection of multi-valent ions in the NF retentate and 0% rejection of mono-valent ions (i.e., no change in the concentration of mono-valent ions between the feed water and the permeate), there would be no dilution of mono-valent ions in the reject stream, because 0% rejection of mono-valent ions in the NF reject stream indicates that the concentration of these mono-valent ions will be the same in the feed, the permeate and the reject. Thus, while the retentate would have a higher concentration of multi-valent ions in the NF reject stream, the concentration of mono-valent ions will remain the same.

This is the case for an ideal NF membrane; as a practical matter, a more typical rejection rate for mono-valent ions is in the range of 10%-70% due to at least a portion of the mono-valent ions being unable to pass through the NF membrane. As a result, the NF reject mono-valent ion concentration can be expected to be higher than in of the feed water, albeit not concentrated as much as the multi-valent ions are concentrated due to their nearly 100% rejection by the NF membrane.

Another challenge when increasing the concentration of multi-valent ions in an NF retentate stream is increase in the risk of scale formation when the ions reach a point of saturation. In order to avoid scale deposition on the NF membranes, usually the membrane concentration process is limited to lower separation levels, with the ion concentration in the NF reject being kept below a saturation limit (also referred to as the saturation index). This limitation remains a concern even if an anti-scalant has been added to inhibit scale formation on the surface of the NF membranes.

Typically NF separation systems also have had to be limited due to limits on the membrane design and material, such as limits on the maximum permissible operating pressure differential across the membrane, limits on the available total membrane area, and unavoidable regions in the NF membrane design conducive to enhancing scale deposition.

Thus, in order to maximize the ratio of multi-valent ions to mono-valent ions in a concentrated mineral product, two primary challenges are the lack of reduction of mono-valent ion concentration in the NF retentate, and the increasing scale deposition risk (a concern which is amplified in facilities employing multistage NF treatment systems).

The present invention addresses these and other problems with a multi-stage arrangement of nano-filtration systems, by design of a system to selectively increase the ratio of multi-valent ions to mono-valent ions in a manner which provides a much higher purity of the multi-valent ion product, and does so in a cost-efficient manner. In the present invention saline water is accepted as the feed stream into a multistage NF process. In order to reduce the concentration of the mono-valent ions and to reduce the scale deposition risk, between the nano-filtration stages water that is less saline than the original source saline water, preferably lower salinity water below the World Health Organization (WHO) salinity limit of 1000 mg/L, introduced into the preceding stage's NF retentate stream. This reduces the concentration of the mono-valent ions entering the next NF stage, and reduces the scale deposition risk by reducing the overall ion concentrations in the previous stage's NF reject. Notably, while this approach reduces the concentration of both mono- and multi-valent ions in the previous stage's NF reject before entering the next NF stage, the total mass of ions (typically expressed in milligram equivalents ("quantity")) in the diluted feed stream is not reduced.

In the next NF stage, because of the higher rejection in nanofiltration units of multi-valent ions over mono-valent ions, and further because the ratio of multi-valent ions to mono-valent ions previously had been substantially increased in the upstream NF stage's processing, the concentration of mono-valent ions in the downstream stage's NF reject stream is further reduced relative to the multi-valent ions that still remain in downstream stage's NF reject. Thus, the ratio of multi-valent ions to mono-valent ions in the downstream stage's NF reject is higher than the upstream stage's NF reject stream.

The present invention includes embodiments in which "n" multiple NF stages are arranged in a similar manner, preferably with lower salinity water being suppled between each NF stage to reduce the risk of scaling and further decrease the mono-valent ion concentration. The number of NF stages may be determined by the amount of concentration ratio increase desired to be obtained, i.e., by adding NF stages until the desired ratio of multi-valent ions to mono-valent ions is reached.

While generally preferred, the addition of lower salinity water to the previous stage's NF reject need not to be made before every subsequent NF stage. In addition, where the concentrations of the NF stages' permeate and/or reject streams support such use, a portion of a permeate and/or a reject stream may be recycled into an NF unit feed stream as a further concentration reduction measure. Examples of such alternative arrangement embodiments are discussed further in the following description of example embodiments of the present invention.

Different types of NF membranes may be utilized for different stages, depending on the desired final product and facility design constraints. For example, some NF membranes have similar rejection for Ca++ and Mg++ (on the order of 70-98%), while other NF membranes have lower rejection for Ca++ (30-70%) and equal or higher rejection for Mg++ (70-85%). The ratio of Ca to Mg therefore may be managed by the selection and/or mixing of NF process stages of difference types. This can be of particular importance when the product is ultimately to be used for plant irrigation, an application in which where it is often critical to maintain particular target ratio for specific minerals.

Other objects, advantages and novel features of the present invention will become apparent from the following detailed description of the invention when considered in conjunction with the accompanying drawings.

DETAILED DESCRIPTION

Figure 1:
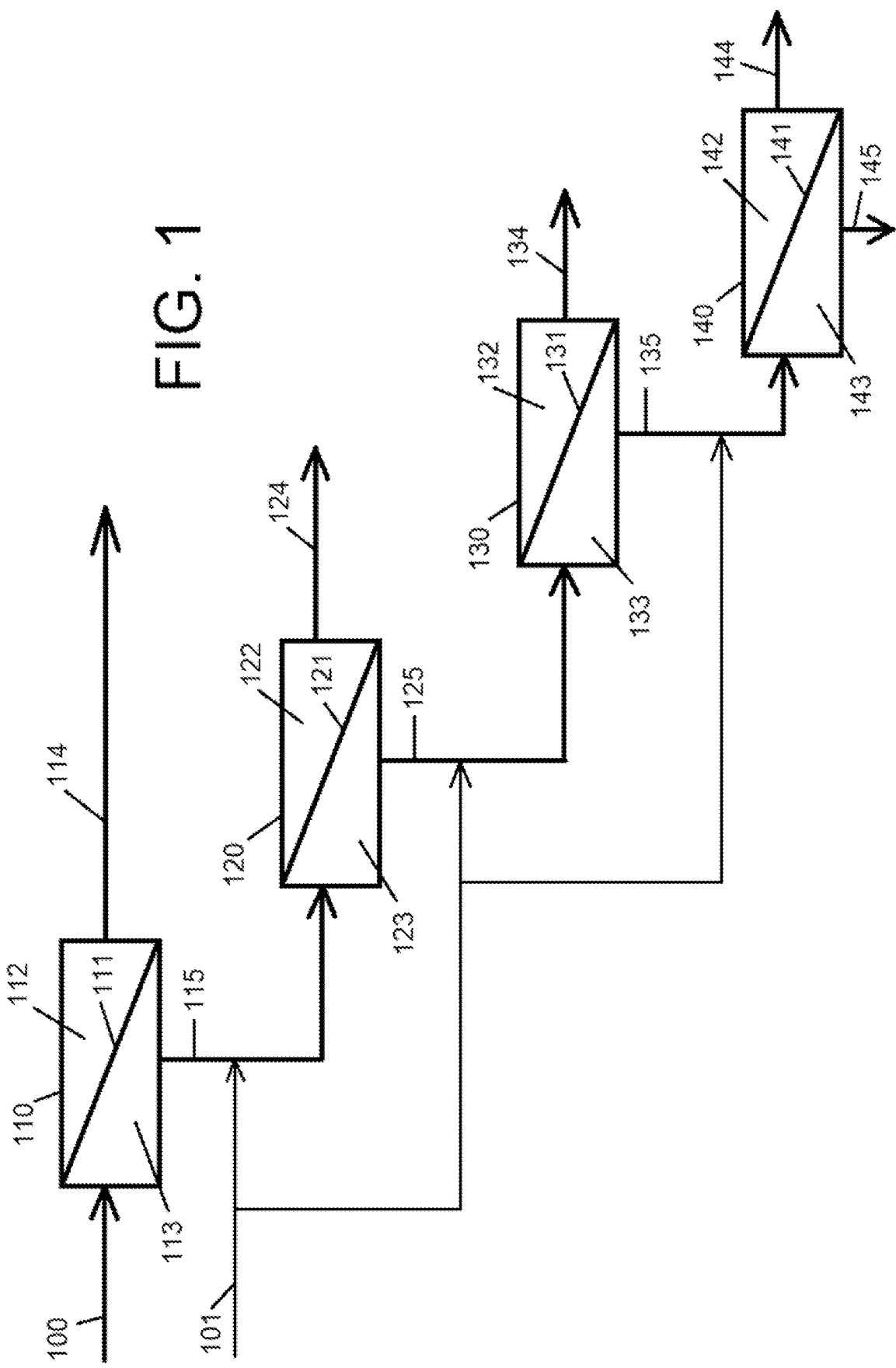
FIG. 1 is a schematic illustration of an embodiment of a multi-stage nanofiltration multi-valent ion concentration system in accordance with the present invention.

FIG. 1 shows an example embodiment of a multi-valent ion concentration system with multi-stage nanofiltration in accordance with a first embodiment of the present invention. In this embodiment, a saline source water 100, such as seawater, is fed into a first nanofiltration (NF) unit 110 as the first NF unit feed. In the first NF unit 110, a membrane 111 selectively permits mono-valent ions such as sodium and chloride to pass to a permeate side 112, leaving multi-valent ions such as calcium and magnesium in a retentate side 113 of the first NF unit 110. The first NF permeate stream 114 which leaves the first NF unit 110 is transported downstream for further processing and/or use in other applications. The first NF unit reject stream 115, now higher multi-valent-to-mono-valent ratio than the saline source water 100, passes out of the first NF unit 110.

Between emerging from the first NF unit 110 and entry as feed water to a second NF unit 120, the first NF unit reject stream 115 is diluted by the addition of lower salinity water 101, which lowers the concentration of both multi-valent and mono-valent ions, and helps minimize scaling concerns by reducing the stream concentrations to below scaling risk limit concentrations. The lower salinity water has a lower concentration of minerals than the original saline source water. Although diluted, the ratio of multi-valent ions to mono-valent ions remains the same as when the first NF unit reject stream 115 emerges from the first NF unit 110, and the total quantity of the ions (milligram equivalents) in the reject stream is unchanged. The present invention is not limited to dilution of an upstream NF unit's NF reject before the NF reject enters a downstream NF unit. Alternatively, the lower salinity water may be received in the downstream NF unit's retentate side and mixed with the incoming NF reject stream from the upstream NF unit, as long as sufficient dilution occurs near the downstream NF unit's feed inlet to avoid undesirably large localized scale deposition from the incoming undiluted NF reject stream.

As in the first NF unit 110, the diluted first NF unit reject 115 is processed in the second NF unit 120 with mono-valent ions traversing the membrane 121. The mono-valent ions exit from the permeate side 122 in the second NF permeate 124, while the multi-valent ion-rich second NF unit reject stream 125 leaves the second NF unit's retentate side 123. With this second nanofiltration step, the ratio of the concentration of multi-valent ions to mono-valent ions in the second NF unit reject stream 125 is further increased.

After the second NF unit reject stream 125 leaves the second NF unit 120, in this embodiment the lower salinity water is also injected to dilute the stream 125 to lower concentrations and avoid scaling. Depending on the facility design and processing requirements, the addition of lower salinity water is not required between every pair of previous and next NF stages. For example, if at a next stage the scaling risk is already low, further dilution may not be required. Also, in this embodiment the source of the lower salinity water is shared between all of the stages, but the inter-stage lower salinity water injection may be provided at different locations with different lower salinity water sources, as long as these sources provide sufficient dilution to obtain the desired product. For example, a portion of the low salinity stream from a reverse osmosis (RO) unit may be used at one injection point, thereby making additional utilization of the output from the RO unit, while a different-concentration stream output from another desalination process or other industrial process is used between other NF stages.

There may be "n" number of stages in the present invention, with the number of stages typically determined by the level of purity desired in the final product from the "nth" NF unit reject stream. In the FIG. 1 embodiment, similar third and fourth NF units 130, 140, with respective corresponding membranes 131, 141, permeate sides 132, 142, retentate sides 133, 143, permeate streams 134, 144, and NF reject streams 135, 145 are illustrated. The final NF unit reject stream 145 has the highest ratio of multi-valent to mono-valent ions, i.e., high purity, with very low mono-valent ion concentrations. This product may be used in a liquid form as-is, may be diluted to suit a particular application, may be further concentrated by liquid removal, dried into a solid form, transported for further processing as a feed stock for another process, or otherwise handled to suit a downstream application.

A quantitative illustration of example system flows and concentrations is presented in Tables 1-4, below, in conjunction with a second embodiment of the present invention shown in FIG. 2.

In the embodiment shown in FIG. 2, a portion 202 of the fourth NF unit reject stream 245 is recirculated into the saline source water 200, thereby increasing the amount of multi-valent ions in the NF unit 210's feed and the ratio of multi-valent ions to mono-valent ions, and helping maintain the concentrations below their respective scaling risk limits. This embodiment shows recirculation of the fourth NF unit reject stream 245 into the saline source water 200 feed, but such recirculation may be directed between any pair of NF unit stages. The recirculation also does not have to be from the final NF unit stage, but may be from one or more of the intermediate NF stages.

Figure 2:
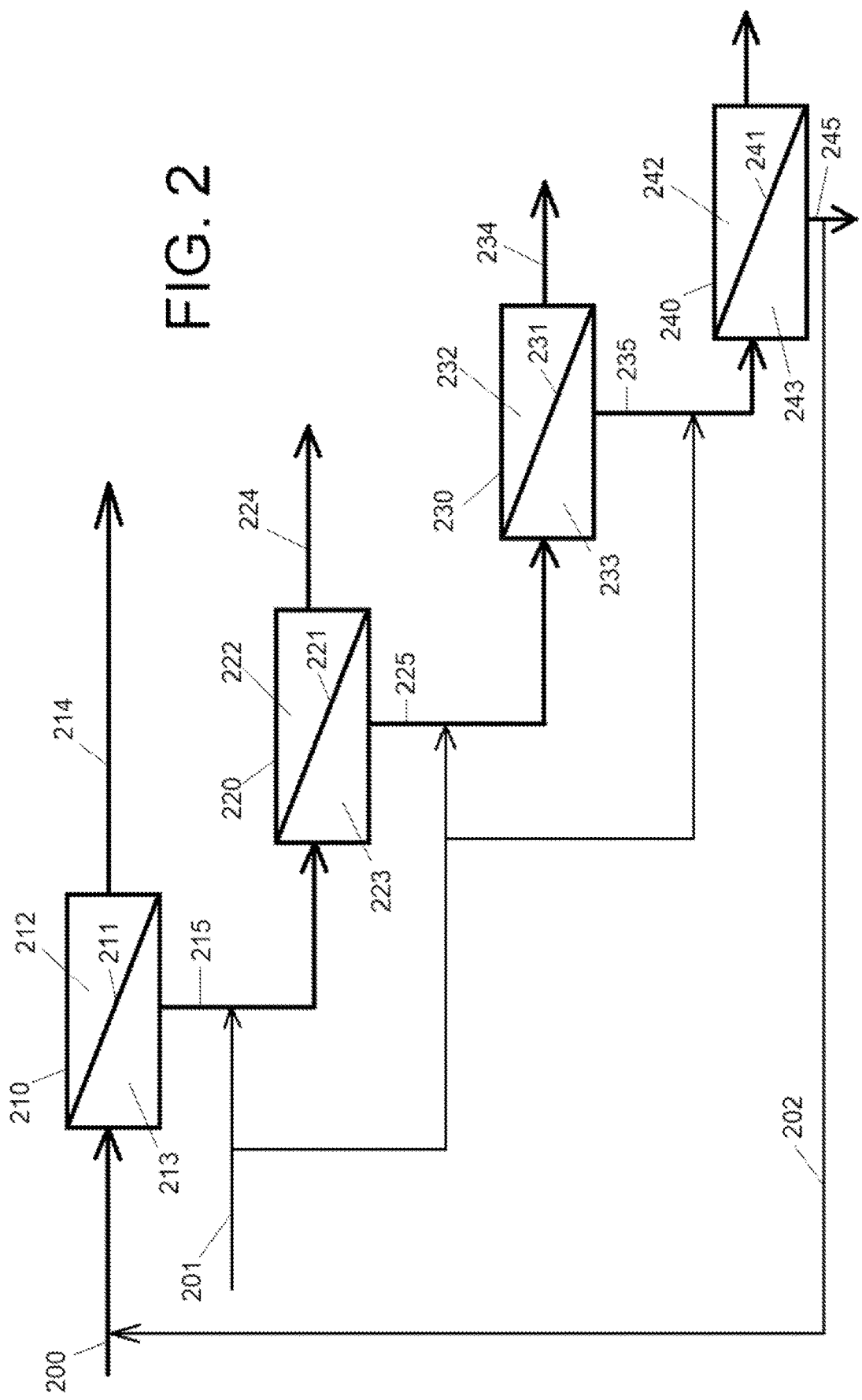
FIGS. 2 to 5 are additional embodiments of a multi-stage nanofiltration multi-valent ion concentration system in accordance with the present invention.

Table 1 shows example the changes in concentrations of key ions and the increase in the ratio of the primary multi-valent to mono-valent ions of interest (Ca+Mg)/(Na+Cl) in the first stage of an embodiment such as in FIG. 2, in which the scaling risk is limited to a $CaSO_4$ saturation of 250%, and the feed saline source water receives 30% recirculation from the final stage nanofiltration unit.

TABLE 1

| (unit: ppm) | Seawater | NF#1 Feed (after mixing with 30% recirculation) | NF#1 Reject |
|---|---|---|---|
| TDS (total dissolved solids) | 41,000 | 40,300 | 65,900 |
| Cl- | 22,400 | 21,200 | 26,300 |
| Na+ | 12,500 | 11,800 | 14,700 |
| SO4-- | 3,500 | 4,540 | 17,160 |
| Mg++ | 1,500 | 1,660 | 5,420 |
| Ca++ | 450 | 460 | 1,300 |
| K+ | 480 | 450 | 560 |
| HCO3- | 160 | 160 | 390 |
| (Ca+Mg)/(Na+Cl) | 5.6% | 6.4% | 16.4% |
| CaSO$_4$ saturation | N/A | N/A | 250% |

In this first stage the ratio of multi-valent ions to mono-valent ions has approximately tripled to 16.4%.

Table 2 shows changes in concentrations and the increase in the ratio of multi-valent to mono-valent ions (Ca+Mg)/(Na+Cl) in the second stage, where the scaling risk is again limited to a CaSO$_4$ saturation of 250%, and the NF reject 215 from the first NF unit 210 receives lower salinity water 201 from a reverse osmosis process at a ratio of approximately 2.75 liters of lower salinity water added per liter of NF reject. At the end of this stage, the ratio of multi-valent ions to mono-valent ions has reached 41.6%.

TABLE 2

| (unit: ppm) | NF#1 Reject | NF#2 Feed (after mixing with RO product water) | NF#2 Reject |
|---|---|---|---|
| TDS | 65,900 | 17,400 | 36,700 |
| Cl- | 26,300 | 7,000 | 8,600 |
| Na+ | 14,700 | 3,900 | 4,900 |
| SO4-- | 17,160 | 4,520 | 17,100 |
| Mg++ | 5,420 | 1,430 | 4,600 |
| Ca++ | 1,300 | 340 | 970 |
| K+ | 560 | 150 | 190 |
| HCO3- | 390 | 100 | 250 |
| (Ca+Mg)/(Na+Cl) | 16.4% | 16.3% | 41.6% |
| CaSO$_4$ saturation | 250% | N/A | 250% |

At the end of the second stage, the ratio of multi-valent ions to mono-valent ions has further increased 2.5 times from 16.3% to 41.6%.

Table 3 shows changes in concentrations and the increase in the ratio of multi-valent to mono-valent ions (Ca+Mg)/(Na+Cl) in the third stage, where the NF reject 225 from the second NF unit 220 receives lower salinity water 201 at a ratio of approximately 2.5 liters of lower salinity water added per liter of NF reject.

TABLE 3

| (unit: ppm) | NF#2 Reject | NF#3 Feed (after mixing with RO product water) | NF#3 Reject |
|---|---|---|---|
| TDS | 36,700 | 10,700 | 29,300 |
| Cl- | 8,600 | 2,500 | 3,200 |
| Na+ | 4,900 | 1,400 | 1,800 |
| SO4-- | 17,100 | 5,000 | 18,900 |
| Mg++ | 4,600 | 1,360 | 4,400 |
| Ca++ | 970 | 280 | 800 |
| K+ | 190 | 60 | 70 |
| HCO3- | 250 | 70 | 180 |
| (Ca+Mg)/(Na+Cl) | 41.6% | 41.2% | 105.4% |
| CaSO$_4$ saturation | 250% | N/A | 250% |

At the end of the third stage, the ratio of multi-valent ions to mono-valent ions has increased another 2.5 times to 105.4%.

Table 4 shows the results of the fourth and final nanofiltration stage in the FIG. 2 embodiment. Similar to the previous stages, the NF reject 235 from the third NF unit 230 receives lower salinity water 201 at a ratio of approximately 2.25 liters of lower salinity water added per liter of NF reject. Following the fourth stage nanofiltration process the increase in the ratio of multi-valent to mono-valent ions (Ca+Mg)/(Na+Cl) is again approximately 2.5 times, to 263.1%, while the original saline source water's Na+Cl concentration has been reduced nearly 20 times, from 34,900 ppm to 1,900 ppm. Throughout the nanofiltration stages in this embodiment, scaling risk has been managed to the CaSO$_4$ saturation limit of 250%.

TABLE 4

| (unit: ppm) | NF#3 Reject | NF#4 Feed (after mixing with RO product water) | NF#4 Reject |
|---|---|---|---|
| TDS | 29,300 | 9,000 | 29,000 |
| Cl- | 3,200 | 1,000 | 1,200 |
| Na+ | 1,800 | 600 | 700 |
| SO4-- | 18,900 | 5,800 | 22,000 |
| Mg++ | 4,400 | 1,400 | 4,400 |
| Ca++ | 800 | 240 | 680 |
| K+ | 70 | 20 | 30 |
| HCO3- | 180 | 60 | 130 |
| (Ca+Mg)/(Na+Cl) | 105.4% | 102.5% | 263.1% |
| CaSO$_4$ saturation | 250% | N/A | 250% |

In the FIG. 2 embodiment the targeted amount of multi-valent ion concentration increase was 200%, a level which is suitable for use of the final NF reject for, for example, re-mineralization of desalinated water or for agricultural irrigation of crops which have high demand of magnesium and calcium for enhanced yield, such as mangoes. In this example, the target increase was achieved in four NF stages. Additional, or fewer, nanofiltration stages may be used as needed to obtain a desired ratio of multi-valent ions to mono-valent ions. Appropriate adjustment (or between some stages, even elimination) of the amount of lower salinity water introduced into the intermediate NF reject streams and/or the original saline source water stream, as well as use of different nanofiltration membrane types may also be used to adjust process performance.

The amount of lower salinity water and the amount of recirculated NF reject may be varied as necessary to suit the desired product parameters, for example, by increasing or decreasing the amount of lower salinity water added between different stages. Preferably, the ratio or lower salinity water to NF reject is in the range of 2:1 to 5:1, however, the present invention is not limited to these ranges, and includes a ratio of 0:1, i.e., no lower salinity water addition between one or more stages. Similarly, the amount of recirculation may be increased or decreased, and/or the recirculation arrangements may be varied, for example, by supplying downstream NF reject to more than one upstream NF reject stream, and/or more than one downstream NF reject stream may be used as a source for recirculation to one or more upstream NF reject streams.

Figure 3:
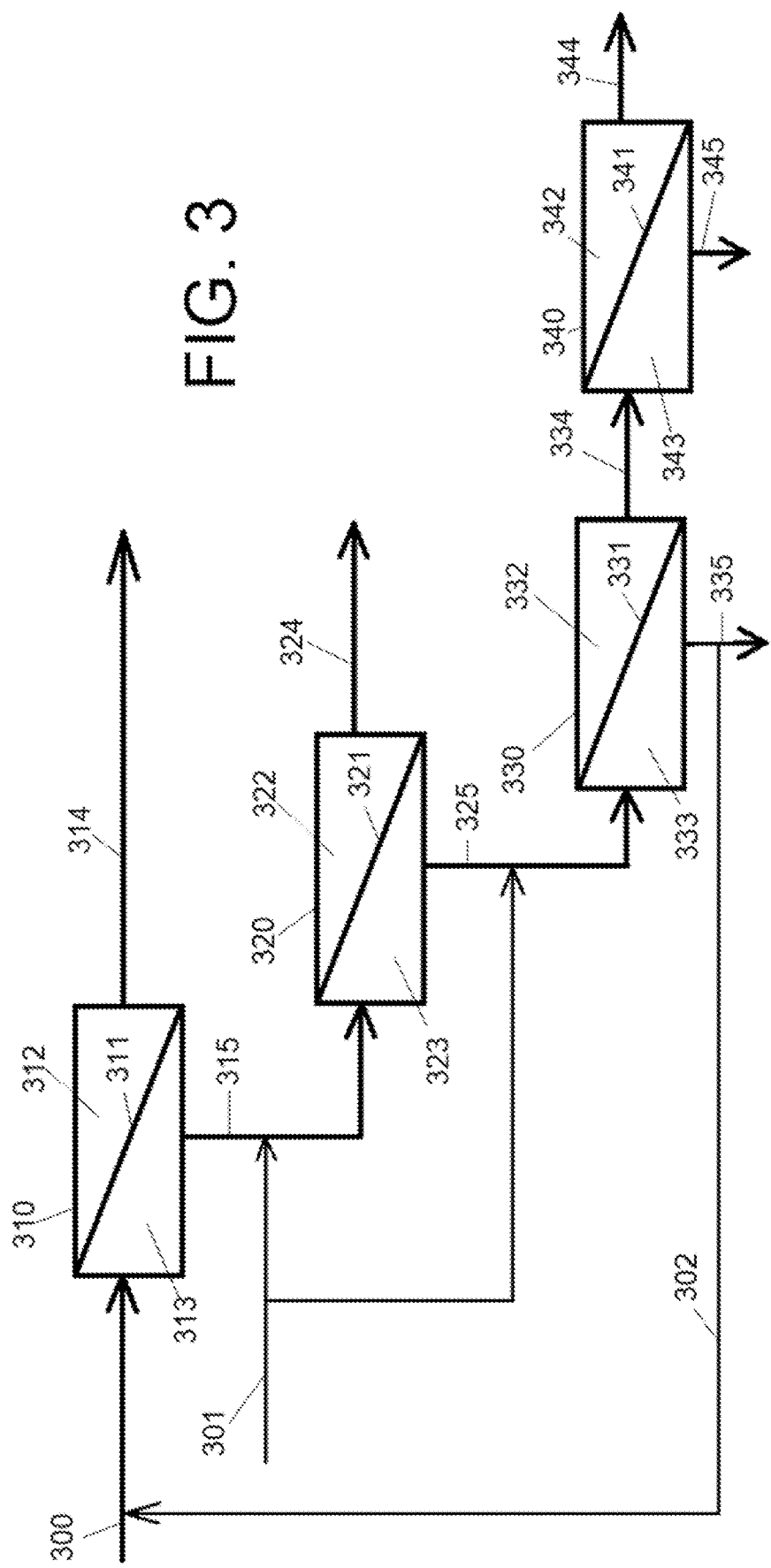

FIG. 3 illustrates another embodiment of the present invention. As compared to the FIG. 2 embodiment, in FIG. 3 lower salinity water 301 is only introduced into the NF reject streams 315, 325 from the first and second NF units 310, 320, respectively. At least a portion 302 of the intermediate third NF unit reject stream 335 is recirculated to the original saline source water being fed into the first NF unit 310. Alternatively, depending on the system needs and design, recirculated NF reject may originate from any of the downstream NF units, up to and including the "n-1th" NF unit at the end of an "n"-length NF unit system.

In addition to the above differences, in the FIG. 3 embodiment the feed stream into the last NF unit 340 (which may be the "nth" NF unit in an embodiment with more NF stages) is the previous NF unit's permeate stream 334, which is then processed in the NF unit 340 to obtain the desired product. Some of the benefits of this type of configuration is that the final NF unit's reject 345 is free from substances which are rejected at the previous NF unit 330's NF membrane 331. For example, if an anti-scalant is being added to the NF system to minimize scale deposition, but the presence of the anti-scalant is not desired in the final product, a configuration such as in FIG. 3 eliminates this concern. Similarly, because nanofiltration rejects undesired contaminants such as bacteria, colloids, viruses and color, a configuration such as in FIG. 3 permits the final product to be free from such contaminants that might be present in the "n-1th" NF unit's NF reject. This arrangement may also result in a lower total dissolved solids content in the final product, and final product might have desirably different ratio of multi-valent ions. This latter advantage is due to different NF membranes having different rejections for some same-valent ions (e.g., selective decreasing of the ratio of calcium to magnesium by using an NF membrane with higher rejection performance for magnesium as compared to calcium).

The use of NF permeate as a feed source is not limited to using the "n-1th" NF unit's permeate as the feed into the "nth" NF unit, but may be applied between any of the upstream nanofiltration stages. For example, FIG. 4 is an embodiment of the present invention in which the NF permeate 414 from the first NF unit 410 is the feed water, along with a recirculated portion 402 of NF reject 445, that is fed into the second NF unit 420.

Figure 4:
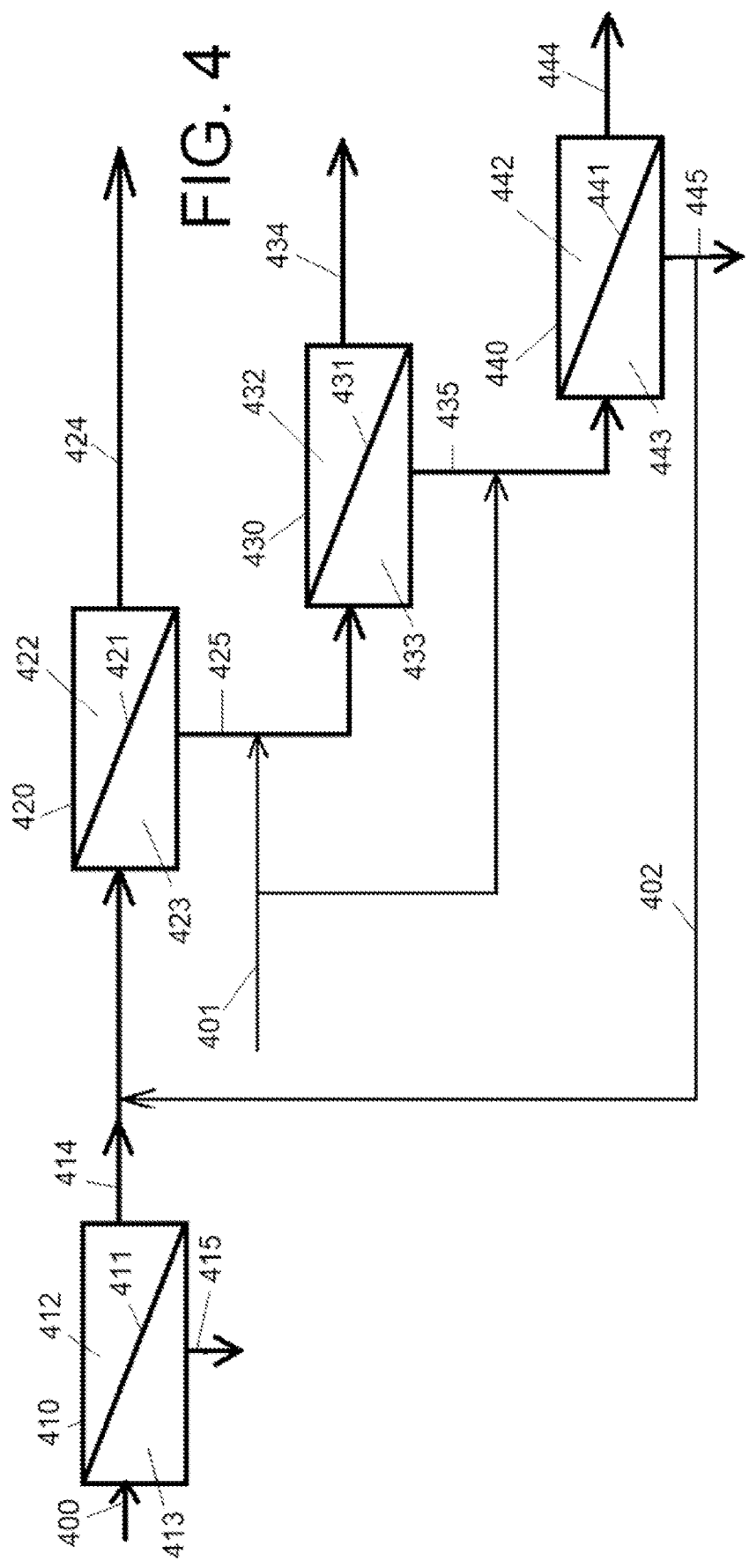

In the FIG. 4 embodiment, in which the NF permeate stream 414 from the first NF unit 410 is used as the feed water for the second NF unit 420, along with a recirculated portion 402 of the NF reject 445 from the last NF unit 440. In this arrangement, the undesired contaminates are removed from the system at an earlier stage as compared to the FIG. 3 embodiment, minimizing contaminate content in the downstream nanofiltration units.

The present invention is not limited to embodiments in which only a single NF permeate stream is the feed water to a downstream NF unit, but includes embodiments in which more than one NF permeate stream is used as the feed water to one or more downstream NF units.

Figure 5:
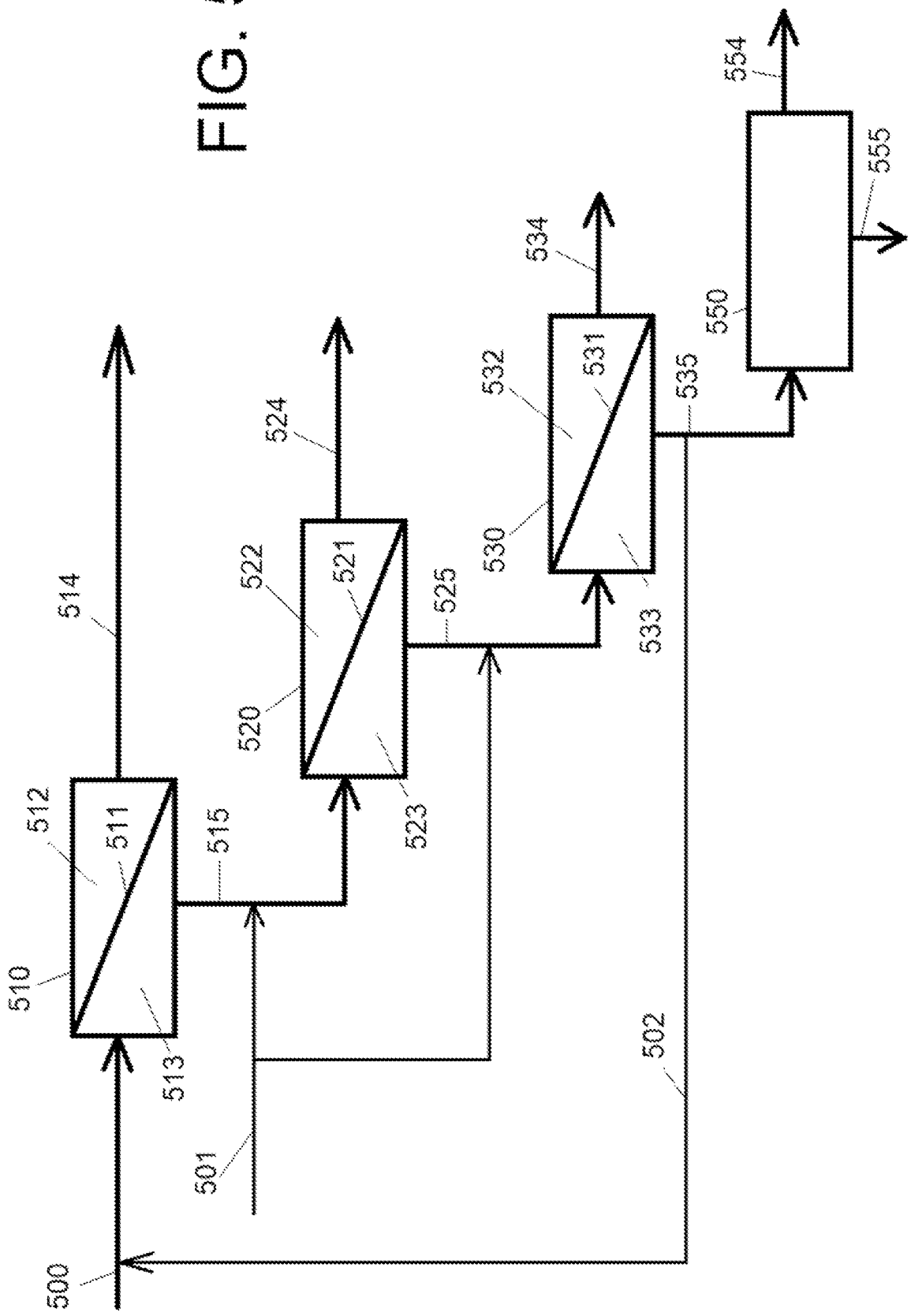

The embodiment shown in FIG. 5 is a variation of the present invention in which the final stage of the system includes a desalinator/concentrator 550. This unit is included in the process train after the target ratio of multi-valent ion to mono-valent ions has been achieved. The ion content of the product water is then concentrated by the desalinator/concentrator 550 to a desired concentration level. A desalinator/concentrator typically rejects all ions at similar rates, i.e., does not further selectively remove different ions. As a result the desalinator/concentrator 550 only concentrates the ions in the previous NF unit 530's NF reject 535, which already has a multi-valent ion to mono-valent ion ratio at or above the target ratio. Accordingly, the concentrated product 555 has approximately the same multi-valent ion to mono-valent ion ratio, in a lower product volume. A desired concentration of a target ratio-satisfying NF reject is not limited to the use of a desalinator/concentrator, but may be performed by any suitable process which reduces the volume of the final NF reject.

The present invention provides the capability to concentrate selected multi-valent ions relative to mono-valent ions in a saline source water, with the ratio of desired multi-valent ions and/or undesired mono-valent ions being able to be determined by variations in the system design and operating parameters, e.g., use of different nanofiltration membrane technologies, use of different scaling risk limits, use of different amounts of lower salinity water dilution and/or NF reject recirculation, rearrangement of dilution and/or recirculation injection locations.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

LISTING OF REFERENCE LABELS 100, 200, 300, 400, 500 saline source water
101, 201, 301, 401, 501 lower salinity water
202, 302, 402, 502 recirculated nanofiltration reject
110, 120, 130, 140, 210, 220, 230, 240, 310, 320, 330, 340, 410, 420, 430, 440, 510,
520, 530 nanofiltration unit
550 desalinator/concentrator
111, 121, 131, 141, 211, 221, 231, 241, 311, 321, 331, 341, 411, 421, 431, 441, 511,
521, 531 nanofiltration membrane
112, 122, 132, 142, 212, 222, 232, 242, 312, 322, 332, 342, 412, 422, 432, 442, 512,
522, 532 nanofiltration unit permeate side
113, 123, 133, 143, 213, 223, 233, 243, 313, 323, 333, 343, 413, 423, 433, 443, 513,
523, 533 nanofiltration unit retentate side
114, 124, 134, 144, 214, 224, 234, 244, 314, 324, 334, 344, 414, 424, 434, 444, 514,
524, 534 nanofiltration permeate
554 desalinator/concentrator—low concentration water
115, 125, 135, 145, 215, 225, 235, 245, 315, 325, 335, 345, 415, 425, 435, 445, 515,
525, 535 nanofiltration reject
555 desalinator/concentrator—high concentration product

What is claimed is:

1. A method for increasing a ratio of multi-valent ions to mono-valent ions in a multistage nanofiltration system having a plurality of nanofiltration units, the method comprising:

filtering a saline source water comprising saline through the plurality of nanofiltration units in series, wherein a first one of the plurality of nanofiltration units receives the saline source water and each of the plurality of nanofiltration units in the series filters a feed water and forms a nanofiltration permeate stream and a nanofiltration reject stream, the nanofiltration reject stream comprising a greater concentration of multi-valent ions than in the feed water; and diluting the nanofiltration reject stream from more than one of the plurality of nanofiltration units with a lower total dissolved salts water comprising a total dissolved salts lower than a total dissolved salts of the saline source water, to form a diluted nanofiltration reject stream comprising a ratio of the lower total dissolved salts water to the nanofiltration reject stream of 2:1 to 5:1, and filtering the diluted nanofiltration reject stream through one or more of the plurality of nanofiltration units to form a filtered diluted nanofiltration reject stream.

2. The multi-valent ion concentration method of claim 1, wherein the filtered diluted nanofiltration reject stream from a last one of the plurality of nanofiltration units in the series comprises a ratio of multi-valent ions to mono-valent ions that is increased by at least 200% as compared to a ratio of multi-valent ions to mono-valent ions in the saline source water.

3. The multi-valent ion concentration method of claim 1, wherein a concentration of Na and Cl in a nanofiltration reject stream has been reduced to at least $1/6^{th}$ as compared to Na and Cl concentration in the saline source water.

4. The multi-valent ion concentration method of claim 1, wherein diluting the nanofiltration reject stream does not produce a diluted nanofiltration reject stream comprising a multi-valent ion scaling concentration of $CaSO_4$ that is greater than 250% of a $CaSO_4$ saturation concentration.

5. The multi-valent ion concentration method of claim 1, further comprising recirculating at least a portion of the nanofiltration reject stream from one nanofiltration unit of the plurality of nanofiltration units into the feed water of an upstream nanofiltration unit of the plurality of nanofiltration units.

6. The multi-valent ion concentration method of claim 5, wherein the portion of the nanofiltration reject stream recirculated is recirculated into the saline source water received by the first one of the plurality of nanofiltration units.

7. The multi-valent ion concentration method of claim 6, wherein the portion of the nanofiltration reject stream recirculated is from a last one of the plurality of nanofiltration units in the series.

8. The multi-valent ion concentration method of claim 1, further comprising supplying at least a portion of the nanofiltration permeate stream from one of the plurality of nanofiltration units as at least a portion of the feed water of a downstream nanofiltration unit of the plurality of nanofiltration units.

9. The multi-valent ion concentration method of claim 8, wherein the downstream nanofiltration unit of the plurality of nanofiltration units is a final nanofiltration unit of the plurality of nanofiltration units in the series.

10. The multi-valent ion concentration method of claim 8, wherein the at least a portion of the nanofiltration permeate stream from the one of the plurality of nanofiltration units is from the first one of the nanofiltration unit.

11. The multi-valent ion concentration method of claim 1, further comprising recirculating at least a portion of the nanofiltration reject stream from a penultimate nanofiltration unit of the plurality of nanofiltration units in the series into the feed water of at least one upstream nanofiltration unit of the plurality of nanofiltration units in the series.

12. The multi-valent ion concentration method of claim 1, wherein the diluting the nanofiltration reject stream comprises diluting each nanofiltration reject stream from a nanofiltration unit that receives a nanofiltration reject stream that comprises a $CaSO_4$ saturation index at or greater than 250%, except the filtered diluted nanofiltration reject stream from a last one of the plurality of nanofiltration units in the series is optionally not diluted and the saline source water is optionally not diluted.

\* \* \* \* \*